United States Patent Office 3,329,642
Patented July 4, 1967

3,329,642
VINYL CHLORIDE RESIN PLASTISOLS STABILIZED WITH POLYETHYLENE GLYCOL MONOLAURATE
Daniel A. Lima, Glen Burnie, and James P. Hamilton, Pasadena, Md., assignors to FMC Corporation, New York, N.Y., a corporation of Delaware
No Drawing. Filed Feb. 18, 1964, Ser. No. 345,578
8 Claims. (Cl. 260—31.4)

This invention relates to vinyl plastisols, and more particularly, to novel vinyl plastisols which may be cured to form vinyl products having varying degrees of rigidity.

The most commonly used poly(vinyl chloride) resins are of two basic types: hot mix resins and dispersion or plastisol resins. Vinyl hot mix resins are finely divided solids which can be blended with plasticizer by hot milling or dry blending to form a plastic mass or finely divided solid which is suitable for molding.

Vinyl dispersion resins are non-porous, finely divided solids having a particle size somewhat smaller than that of hot mix resins. These resins are formulated into pastes and more fluid mixes, called plastisols, by the addition of a relatively large amount of plasticizer. The primary advantage of the plastisol technique is the fluid consistency of the composition before fusion which renders it suitable for rotational and slush moldings, spray, dip, curtain and spread coating, film and mold casting, extruding, and foaming.

Rigid vinyl products have been prepared from hot mix resins by leaving out the plasticizer. However, the processing techniques available for these resins are limited essentially to molding.

Attempts have been made to prepare plastisols from which rigid vinyl products can be produced by techniques other than molding. Such plastisols are herein referred to as "rigid plastisols." For example, it has been suggested that rigid plastisols may be prepared by adding a reduced amount of low viscosity plasticizer to the dispersion resin and further reducing the viscosity of the plastisol by adding a vinyl extender resin and a viscosity depressant such as a surfactant. However, the vinyl products resulting from such plastisols are only semi-rigid and they have an undesirably low softening temperature resulting from the use of the special primary plasticizers.

Another attempt to prepare rigid plastisols is taught in U.S. Patent No. 2,618,621. This patent describes rigid plastisols containing polyethylene glycol dimethacrylate, a reactive plasticizer, as the sole plasticizer present. A peroxide is added to the plastisol to cure the polyethylene glycol dimethacrylate during fusion, thereby rigidizing the resulting vinyl product. However, this system has not been accepted primarily because the dimethacrylate ester is expensive and its curing is difficult to control.

It has been suggested that less expensive monomers such as diallyl phthalate be used as the reactive plasticizer for rigid plastisols. However, it was found that plastisols containing diallyl phthalate are not stable since diallyl phthalate solvates the dispersion resin, thus causing the plastisol to gel within a very short time. Although the vinyl products resulting from these plastisols are truly rigid, these plastisols have not been acceptable, due to their extremely short pot life, except in limited situations involving small amounts of plastisol which can be used immediately after preparation.

It is an object of this invention to provide an inexpensive, viscosity stable vinyl plastisol which gives truly rigid products.

Another object is to provide a diallyl phthalate-containing vinyl plastisol which is viscosity stable.

Still another object is to provide an inexpensive, viscosity stable vinyl plastisol from which vinyl products having any desired degree of rigidity can be prepared.

These and other objects will become apparent from the following description of this invention.

We have now discovered viscosity stable, diallylic phthalate-containing vinyl plastisol compositions which comprise, by weight, 20–90 parts of vinyl dispersion resin, 10–80 parts of vinyl extender resin having an average dry particle size greater than about 170 mesh, 10–100% of diallylic phthalate based upon the vinyl resin, 0–90% of conventional vinyl plasticizer based upon the vinyl resin, the sum of the diallylic phthalate and the conventional vinyl plasticizer being 30–100% based upon the vinyl resin, 0.1–5% of free-radical polymerization initiator based upon the diallylic phthalate, 0.1–5% of polyethylene glycol monolaurate based upon the vinyl resin, and an effective amount of conventional heat stabilizer for the vinyl resin.

Quite surprisingly, the presence of both the vinyl extender resin and polyethylene glycol monolaurate effectively stabilizes the viscosity of diallylic phthalate-containing vinyl plastisols, which would otherwise gel very quickly due to solvation of the dispersion resin by the diallylic phthalate. Although the vinyl plastisols of this invention have the primary advantage that they form vinyl products which are truly rigid, any desired degree of flexibility can be imparted to the vinyl product by the addition of conventional plasticizer to the plastisol. Moreover, vinyl products derived from the novel plastisols described herein have improved adhesion over products derived from plastisols not containing diallylic phthalate.

The novel plastisols of this invention are prepared from a mixture of vinyl dispersion resin and vinyl extender resin. Each of these resins is commercially available and is identified as to its type by the manufacturer. By "vinyl dispersion resin" we mean a homopolymer or copolymer of vinyl chloride which is sufficiently non-porous and of sufficiently small particle size that it is capable of forming a plastisol with conventional primary plasticizers. Suitable copolymers are those containing a major amount of vinyl chloride copolymerized with another vinyl monomer such as vinylidene chloride, various dialkyl maleates including ethyl and butyl maleate, vinyl acetate, various dialkyl acrylates including ethyl and butyl acrylate, and many others.

Vinyl dispersion resins are prepared by emulsion polymerization of vinyl chloride in aqueous medium using a water soluble catalyst and an emulsifying agent as is well known to those skilled in the art. The resin is most commonly recovered by spray-drying. Vinyl dispersion resins are readily distinguished from other vinyl resins by their smaller particle size. The average particle size of a vinyl dispersion resin is generally in the range of about 0.1–5 microns, and more commonly in the range of about 0.5–2 microns.

The novel plastisols of this invention also contain a vinyl extender resin which tends to lower the initial viscosity of the plastisol and, in combination with the polyethylene glycol monolaurate, stabilizes the viscosity at a low level. By "vinyl extender resin" we mean a homopolymer or copolymer of vinyl chloride which is sufficiently non-porous that it reduces the viscosity of a vinyl plastisol when added thereto, but not of sufficiently small particle size that it can form a plastisol by itself with conventional primary plasticizers. Suitable copolymers are those containing a major amount of vinyl chloride copolymerized with another vinyl monomer such as vinylidene chloride, various dialkyl maleates including ethyl and butyl maleate, vinyl acetate, various dialkyl acrylates including ethyl and butyl acrylate, and many others.

Vinyl extender resins may be prepared by emulsion or suspension polymerization of vinyl chloride. Suspension polymerization is generally carried out in aqueous medium using a monomer-soluble peroxide catalyst, a suspending agent, and a small amount of an emulsifying agent as is well known to those skilled in the art. Vinyl extender resins generally have an average dry particle size of about 50–170 mesh, and more commonly about 75–150 mesh.

The vinyl resin mixture which is used to prepare the novel plastisols described herein generally contains about 20–90% by weight of vinyl dispersion resin, and about 10–80% by weight of vinyl extender resin. If the resin mixture contains less than 10% or more than 80% extender resin, the viscosity of the plastisol will be too high. Moreover, when the resin mixture contains more than about 80% extender resin, the cured vinyl product tends to be somewhat grainy. Preferably, the resin mixture should contain about 40–80% dispersion resin and about 20–60% extender resin. Within this range, optimum reduction in viscosity of the plastisol results.

The rigidizing component of the novel plastisols of this invention is the diallylic phthalate. By "diallylic phthalate" we mean the diallyl, dimethallyl and dicrotonyl esters of orthophthalic, isophthalic, terephthalic, tetrahydrophthalic, hexahydrophthalic and 3,6-endomethylene-1,2,3,6-tetrahydrophthalic acids. Diallyl orthophthalate and diallyl isophthalate are particularly preferred because they are commercially available.

The novel plastisols of this invention contain about 10–100% by weight of diallylic phthalate based upon the vinyl resin. The specific amount of diallylic phthalate used will depend upon the viscosity desired for processing, and whether a conventional vinyl pasticizer is also present. When more than about 100% of diallylic phthalate is present, the viscosity of the plastisol is excessively low and the larger particles of the extender resin tend to settle out. The sum of the diallylic phthalate and any conventional vinyl plasticizer present should be at least about 30%, based upon the vinyl resin, thereby providing a sufficiently low viscosity that the plastisol is easily processed. When less than about 10% of diallylic phthalate is present in combination with at least 20% of conventional plasticizer, the rigidizing effect of the diallylic phthalate is not particularly significant. Preferably, the plastisol should contain about 30–80% by weight of diallylic phthalate based upon the vinyl resin.

One of the important features of the present invention is that conventional vinyl plasticizers may be used in the novel plastisols of this invention in amounts varying over wide limits to impart any desired degree of flexibility to the otherwise rigid product. These plasticizers may be added in amounts of about 0–90% by weight based upon the vinyl resin. The use of small amounts of conventional plasticizer improves the impact strength of the otherwise somewhat brittle vinyl product, but it has the disadvantage that it reduces the heat distortion temperature of the product. When rigid vinyl products are desired, the plastisol should contain about 30–100% of diallylic phthalate and no more than about 20% of conventional plasticizer based upon the vinyl resin. The sum of the diallylic phthalate and conventional plasticizer should not be in excess of about 100%, based upon the vinyl resin, since these excessive amounts tend to cause the larger particles of the extender resin to settle out due to the extremely low plastisol viscosity. When preparing semi-rigid vinyl products, the plastisol should contain about 20–80% of diallylic phthalate and about 20–50% of conventional plasticizer. When flexible vinyl products having improved adhesion are desired, the plastisol should contain about 10–20% of diallylic phthalate and about 30–90% of conventional plasticizer.

Any plasticizer which is conventionally used in the preparation of vinyl plastisols may be used in the novel plastisols of this invention. In other words, the selection of the plasticizer wil lbe governed by the same factors as those used in selecting a plasticizer for conventional plastisols. Plasticizers which conventionally increase or decrease the viscosity of plastisols will have the same general effect upon the plastisols of this invention. The properties of the final product will generally be the sum of the rigidizing effects of the diallylic phthalate and the flexibilizing effects of the conventional plasticizer.

Both primary and secondary vinyl plasticizers may be used in the novel plastisols described herein. Typical examples of suitable primary plasticizers include organic dicarboxylic ester plasticizers such as dibutyl phthalate, diethoxyethyl phthalate, dicyclohexyl phthalate, dibutoxyethyl phthalate, dioctyl phthalate, dioctyl tetrachlorophthalate, di(2-ethylhexyl) phthalate, diisodecyl phthalate, bis(tridecyl) phthalate, octyl fatty alcohol phthalates, dibutyl adipate, dioctyl adipate, dibutyl sebacate, dibenzyl sebacate and dioctyl sebacate; triorganic phosphates such as triethyl phosphate, tributyl phosphate, triphenyl phosphate, tricresyl phosphate, tributoxyethyl phosphate and trioctyl phosphate; and mixtures thereof. Organic dicarboxylic ester plasticizers are preferred. Typical examples of suitable, secondary plasticizers include methyl pentachlorostearate, chlorinated paraffin waxes, hydrogenated terphenyl, and epoxy esters such as epoxidized butyl oleate and epoxidized dioctyl tetrahydrophthalate.

In order to cure the diallylic phthalate during fusion of the plastisol, about 0.1–5% by weight of a free-radical polymerization initiator, based upon the diallylic phthalate, should be present. When the plastisol is fused in thick sections, smaller amounts of initiator, down to about 0.1%, are effective since the exotherm developed during cure of the diallylic phthalate is not readily dissipated. When the plastisol is fused in thin films, larger amounts of initiator, up to about 5%, may be used. No further benefit is derived from the use of more than about 5% of initiator and such amounts are economically undesirable. In most cases, the optimum amount of initiator will be in the range of about 0.5–2% by weight based upon the diallylic phthalate. Suitable free-radical initiators include organic peroxides such as benzoyl peroxide, p-chlorobenzoyl peroxide, 2,4-dichlorobenzoyl peroxide, lauroyl peroxide, di(tert-butyl) peroxide, dicumyl peroxide, cyclohexane peroxide, methyl ethyl ketone peroxide, and succinic acid peroxide; organic hydroperoxides such as tert-butyl hydroperoxide, cumene hydroperoxide, p-menthane hydroperoxide, pinane hydroperoxide, and 2,5-dimethylhexane-2,5-dihydroperoxide; organic peroxy esters such as tert-butyl perbenzoate, di(tert-butyl) diperphthalate, tert-butyl peracetate, and isopropyl percarbonate; and azo compounds such as azobisisobutyronitrile.

As a viscosity co-stabilizer for the diallylic phthalate, the plastisols of this invention should contain about 0.1–5% by weight of polyethylene glycol monolaurate based upon the vinyl resin. Polyethylene glycol monolaurate lowers the initial viscosity of the plastisol and stabilizes this initially low viscosity by preventing solvation of the vinyl resin by the diallylic phthalate. Although as little as about 0.1% of polyethylene glycol monolaurate has some lowering effect upon the initial viscosity of the plastisol and imparts a reasonable degree of stability to the plastisol, slightly larger amounts are generally used since they have a correspondingly greater effect upon viscosity and its stability without any apparent adverse effect. More than about 5% of polyethylene glycol monolaurate is generally not necessary. Preferably, about 0.5–2% of polyethylene glycol monolaurate is added.

Several different polyethylene glycol monolaurates are commercially available. These products vary as to the molecular weight of the polyethylene glycol moiety of the molecule. The exact molecular weight of the polyethylene glycol from which the additive is derived is not especially critical. Polyethylene glycol having a molecular weight of about 100 is sufficient to impart viscosity stabilizing properties to the monolaurate derivative. When the molecular weight of the polyethylene glycol is in excess of about 600, the additive tends to be viscous-to-waxy in nature, and thus is not as effective in reducing the initial viscosity of the plastisol. Preferably, the additive is derived from a polyethylene glycol having an average molecular weight of about 200–500.

The novel plastisols of this invention contain an effective amount of a conventional heat stabilizer for the vinyl resin. As in the case of prior art plastisols, the plastisols of this invention should be stabilized to prevent degradation of the vinyl resin due to excessive heat. Any of the conventional vinyl stabilizers of the prior art may be used in accordance with this invention. In other words, this invention places no limitation upon the selection of the heat stabilizer.

The amount of heat stabilizer to be employed in the plastisols of this invention is determined in the same manner as in the case of plastisols of the prior art, that is, by consideration of the processing and fusion temperature, and temperatures which will be encountered in use of the final product. In general, slightly higher than normal fusion temperatures may be encountered for the plastisols of this invention due to the exothermic nature of the diallylic phthalate cure. However, the effect of the exotherm will vary depending upon the thickness of the piece being fused and the specific fusion temperature.

Generally, about 0.5–10% by weight of heat stabilizer based upon the vinyl resin will be used in the plastisols of this invention. Preferably, about 1–5% of heat stabilizer is employed. Suitable heat stabilizers include lead silicate, lead titanate, basic lead carbonate, lead acetate, basic lead acetate, lead naphthenate, tribasic lead sulfate, tribasic lead maleate, dibasic lead phosphite, tribasic lead phosphate, dibasic lead phthalate, lead stearate, lead oleate, bismuth oxide, calcium stearate, calcium silicate, barium oxide, barium stearate, triphenyltin hydroxide, tetraphenyltin, tin mercaptide, dibutyltin dilaurate, strontium naphthenate, barium-cadmium complexes, barium-cadmium-zinc complexes, barium-zinc complexes, calcium-zinc complexes, and many others.

The novel plastisols of this invention are suitable for processing applications such as rotational and slush molding, spray, dip, curtain and spread coating, film and mold casting, extruding, and foaming. Each of these applications is well known to those in the vinyl industry. The novel plastisols of this invention are cured at temperatures in the range of about 250–400° F. The exact temperature employed will depend upon such factors as thickness of the piece being cured, the amount of diallylic phthalate present, and the amount and type of free-radical initiator used. Preferably, the cure temperature is in the range of about 300–375° F. The pressure used during the cure cycle will depend upon the specific application being employed. For example, coating, casting, and foaming applications generally do not require pressure, while pressure is generally utilized in molding. The cure time may be varied over wide limits depending upon the temperature being used, and the thickness of the piece. Basically, longer times will be required for curing at lower temperatures. Coordination of time and temperature during cure is within the skill of the art.

The following examples, illustrating the novel plastisol compositions disclosed herein, are given without any intention that the invention be limited thereto. All parts and percentages are by weight.

EXAMPLE I (A) A vinyl plastisol was prepared as follows: About 70 parts of a vinyl chloride homopolymer dispersion resin known as "Blacar P1716," 30 parts of a vinyl chloride-vinylidene chloride copolymer extender resin having an average dry particle size somewhat in excess of 140 mesh and known as "Geon 202," and 10 parts of dibasic lead phosphite were blended together as a dry mix. About 60 parts of diallyl orthophthalate, 1 part of polyethylene glycol monolaurate derived from polyethylene glycol having a molecular weight of 400, and 0.6 part of di-tert-butyl peroxide were mixed together as a liquid blend. Sufficient liquid blend was then added to the dry ingredients in a Hobart mixer to give a relatively high viscosity plastisol and the plastisol was mixed for 10 minutes without allowing a heat build-up. The remaining liquid blend was then added and mixing was continued for an additional 5 minutes after which the resulting plastisol was deaerated. The initial and aged viscosities of the plastisol were measured with a Brookfield model LVF viscometer using a No. 4 spindle at 30 r.p.m. and found to be as follows:

|  | Cps. |
|---|---|
| Initial | 1,000 |
| 9 days | 2,600 |
| 2 weeks | 2,700 |
| 7 weeks | 5,100 |

A portion of the above plastisol was poured into a slab mold in a molding press and cured under contact pressure at 300° F. for 15 minutes and at 325° F. for 15 minutes. The resulting vinyl product had the following properties, using standard ASTM test methods.

| Shore D hardness | 84 |
|---|---|
| Tensile strength, p.s.i. | 5,800 |
| Elongation, percent | 7 |
| Flexural strength, p.s.i. | 9,220 |
| Flexural modulus, p.s.i. | $.442 \times 10^6$ |

(B) For comparison, a plastisol was prepared following procedure A above except that the 30 parts of extender resin were replaced with an additional 30 parts of the dispersion resin. The resulting plastisol had an initial viscosity of 1,600 cps. and after 9 days the viscosity was 14,300 cps.

(C) For additional comparison, another plastisol was prepared following procedure A above except that the polyethylene glycol monolaurate was omitted. The resulting plastisol had an initial viscosity of 1,100 and after 7 weeks it was 9,600 cps.

(D) For further comparison, another plastisol was prepared following procedure A above except that the extender resin was replaced with additional dispersion resin as in procedure B and the polyethylene glycol monolaurate was omitted as in procedure C. The resulting plastisol had an initial viscosity of 2,400 cps. and after 14 days the viscosity was 50,000 cps.

EXAMPLE II

Following the procedure of Example I, a plastisol was prepared using the following formulation:

| Blacar P1716 dispersion resin | 70 |
|---|---|
| Geon 202 extender resin | 30 |
| Polyethylene glycol 400 monolaurate | 1 |
| Diallyl isophthalate | 60 |
| Dibasic lead phosphate | 10 |
| Dicumyl peroxide | 0.6 |

The resulting plastisol had the following initial and aged viscosities:

|  | Cps. |
|---|---|
| Initial | 1,900 |
| 4 days | 2,250 |
| 1 week | 2,500 |

A portion of the plastisol was cast and cured following the procedure of Example I. The resulting vinyl product was rigid.

EXAMPLE III

Following the procedure of Example I, a plastisol was prepared using the following formulation:

| Blacar P1716 dispersion resin | 70 |
|---|---|
| Geon 202 extender resin | 30 |
| Polyethylene glycol 400 monolaurate | 1 |
| Diallyl orthophthalate | 50 |
| Dioctyl phthalate | 10 |
| Dibasic lead phosphite | 10 |
| Dicumyl peroxide | 0.5 |

The resulting plastisol had the following initial and aged viscosities:

| | Cps. |
|---|---|
| Initial | 1,500 |
| 2 weeks | 1,800 |

A portion of the plastisol was cast and cured following the procedure of Example I. The resulting vinyl product was rigid.

EXAMPLE IV

Following the procedure of Example I, a plastisol was prepared using the following formulation:

| | |
|---|---|
| Blacar P1716 dispersion resin | 70 |
| Geon 202 extender resin | 30 |
| Polyethylene glycol 400 monolaurate | 1 |
| Diallyl orthophthalate | 60 |
| Dioctyl phthalate | 10 |
| Dibasic lead phosphite | 10 |
| Dicumyl peroxide | 0.6 |

The resulting plastisol had the following initial and aged viscosities:

| | Cps. |
|---|---|
| Initial | 900 |
| 7 days | 900 |

A portion of the plastisol was cast and cured following the procedure of Example I. The resulting vinyl product was rigid and had a Shore D hardness of 84.

EXAMPLE V

Following the procedure of Example I, a plastisol was prepared using the following formulation:

| | |
|---|---|
| Blacar P1716 dispersion resin | 70 |
| Geon 202 extender resin | 30 |
| Polyethylene glycol 400 monolaurate | 1 |
| Diallyl orthophthalate | 60 |
| Dioctyl phthalate | 20 |
| Dibasic lead phosphite | 10 |
| Dicumyl peroxide | 0.6 |

The resulting plastisol had the following initial and aged viscosities:

| | Cps. |
|---|---|
| Initial | 800 |
| 11 days | 1,000 |
| 17 days | 800 |

A portion of the plastisol was cast and cured following the procedure of Example I. The resulting vinyl product had a Shore D hardness of 72.

As will be apparent to those skilled in the art, numerous modifications and variations in the formulations illustrated above may be made without departing from the spirit of the invention or the scope of the following claims.

We claim:

1. A viscosity stable, diallylic phthalate-containing poly(vinyl chloride) plastisol composition which comprises, by weight, 20–90 parts of poly(vinyl chloride) homopolymer dispersion resin, 10–80 parts of poly(vinyl chloride) extender resin having an average dry particle size greater than 170 mesh, 10–100% of diallylic phthalate based upon the total weight of the poly(vinyl chloride) resins, 0–90% of conventional poly(vinyl chloride) plasticizer based upon the poly(vinyl chloride) resins, the sum of the diallylic phthalate and the conventional poly(vinyl chloride) plasticizer being 30–100% based upon the total weight of the poly(vinyl chloride) resins, 0.1–5% of free-radical polymerization initiator based upon the diallylic phthalate, 0.1–5% of polyethylene glycol monolaurate based upon the total weight of the poly(vinyl chloride) resins, and an effective amount of conventional heat stabilizer for the poly(vinyl chloride) resins.

2. The viscosity stable, diallylic phthalate-containing poly(vinyl chloride) plastisol composition of claim 1 in which the diallylic phthalate is diallyl orthophthalate.

3. The viscosity stable, diallylic phthalate-containing poly(vinyl chloride) plastisol composition of claim 1 in which the diallylic phthalate is diallyl isophthalate.

4. The viscosity stable, diallylic phthalate-containing poly(vinyl chloride) plastisol composition of claim 1 in which the polyethylene glycol monolaurate is derived from polyethylene glycol having an average molecular weight of 200–500.

5. A viscosity stable, diallyl phthalate-containing rigid poly(vinyl chloride) plastisol composition which comprises, by weight, 40–80 parts of poly(vinyl chloride) homopolymer dispersion resin, 20–60 parts of poly(vinyl chloride) extender resin having an average dry particle size greater than 150 mesh, 30–80% of diallyl phthalate based upon the weight of the total poly(vinyl chloride) resins, 0–20% of conventional organic dicarboxylic ester primary poly(vinyl chloride) plasticizer based upon the total weight of the poly(vinyl chloride) resins, 0.5–2% of organic peroxide free-radical polymerization initiator based upon the diallyl phthalate, 0.5–2% of polyethylene glycol monolaurate based upon the total weight of the poly(vinyl chloride) resins, and an effective amount of conventional heat stabilizer for the poly(vinyl chloride) resins.

6. The viscosity stable, diallyl phthalate-containing rigid poly(vinyl chloride) plastisol composition of claim 5 in which the diallyl phthalate is diallyl orthophthalate.

7. The viscosity stable, diallyl phthalate-containing rigid poly(vinyl chloride) plastisol composition of claim 5 in which the polyethylene glycol monolaurate is derived from polyethylene glycol having an average molecular weight of 200–500.

8. A viscosity stable, diallylic phthalate-containing poly(vinyl chloride) plastisol composition which comprises, by weight, 20–90 parts of poly(vinyl chloride) homopolymer dispersion resin, 10–80 parts of poly(vinyl chloride) extender resin having an average dry particle size greater than 170 mesh, 10–100% of a diallylic phthalate selected from the group consisting of the diallyl, dimethallyl and dicrotonyl esters of orthophthalic, isophthalic, terephthalic, tetrahydrophthalic, hexahydrophthalic and 3,6-endomethylene - 1,2,3,6 - tetrahydrophthalic acids, based upon the total weight of the poly(vinyl chloride) resins, 0–90% of conventional poly(vinyl chloride) plasticizer based upon the total weight of the poly(vinyl chloride) resins, the sum of the diallylic phthalate and the conventional vinyl plasticizer being 30–100% based upon the total weight of the poly(vinyl chloride) resins, 0.1–5% of free-radical polymerization initiator based upon the weight of the diallylic phthalate, 0.1–5% of polyethylene glycol monolaurate based upon the total weight of the poly(vinyl chloride) resins, and an effective amount of conventional heat stabilizer for the poly(vinyl chloride) resins.

References Cited

UNITED STATES PATENTS

| | | | |
|---|---|---|---|
| 2,155,590 | 4/1939 | Garvey | 260—884 |
| 2,327,128 | 8/1943 | Renfrew et al. | 260—899 |
| 2,393,863 | 1/1946 | Myers. | |
| 3,015,640 | 1/1962 | Weaver et al. | 260—31.8 |
| 3,091,597 | 5/1963 | Henriques | 260—899 |
| 3,125,546 | 3/1964 | Harris et al. | 260—886 |

FOREIGN PATENTS

| | | |
|---|---|---|
| 921,032 | 3/1963 | Great Britain. |

OTHER REFERENCES

Doolittle: The Technology of Solvents and Plasticizers, John Wiley & Sons, Inc., 1954, pages 177–182.

Smith: Vinyl Resins, Reinhold Plastics Applications Series, 1958, pages 238–241.

MORRIS LIEBMAN, *Primary Examiner.*

L. T. JACOBS, *Assistant Examiner.*

UNITED STATES PATENT OFFICE
CERTIFICATE OF CORRECTION

Patent No. 3,329,642  July 4, 1967

Daniel A. Lima et al.

It is hereby certified that error appears in the above numbered patent requiring correction and that the said Letters Patent should read as corrected below.

Column 3, line 74, for "wil lbe" read -- will be --; column 6, line 54, for "phosphate" read -- phosphite --.

Signed and sealed this 1st day of October 1968.

(SEAL)
Attest:

Edward M. Fletcher, Jr.
Attesting Officer

EDWARD J. BRENNER
Commissioner of Patents